(12) United States Patent
Campbell et al.

(10) Patent No.: US 6,322,109 B1
(45) Date of Patent: Nov. 27, 2001

(54) EXPANDABLE TUBING CONNECTOR FOR EXPANDABLE TUBING

(75) Inventors: Alasdair Campbell, Ellon; Paul David Metcalfe, Peterculter, both of (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/803,814

(22) Filed: Mar. 12, 2001

Related U.S. Application Data (6362) Continuation of application No. 09/077,777, filed as application No. PCT/GB96/03026 on Dec. 9, 1996.

(30) Foreign Application Priority Data

Dec. 9, 1995 (GB) .................................................. 9525244
Nov. 15, 1996 (GB) .................................................. 9623797

(51) Int. Cl.[7] ............................. F16L 13/14; F21B 23/00
(52) U.S. Cl. ......................... 285/92; 285/382; 403/375; 166/277; 166/207; 138/118
(58) Field of Search ................... 285/382, 90, 91, 285/92; 166/207, 227, 226; 403/297; 138/118

(56) References Cited

U.S. PATENT DOCUMENTS

| | | | |
|---|---|---|---|
| 2,226,804 | * 12/1940 | Carroll | 166/276 |
| 3,353,599 | * 11/1967 | Swift | 166/276 |
| 4,626,129 | * 12/1986 | Kothmann et al. | 405/43 |
| 5,366,012 | * 11/1994 | Lohbeck | 166/277 |
| 5,924,745 | * 7/1999 | Campbell | 285/90 |
| 5,984,568 | * 11/1999 | Lohbeck | 403/375 |
| 6,012,522 | * 1/2000 | Donnelly et al. | 166/276 |
| 6,065,500 | * 5/2000 | Metcalfe | 138/118 |

FOREIGN PATENT DOCUMENTS

98/22690 * 5/1998 (WO) .
98/42947 * 10/1998 (WO) .

* cited by examiner

Primary Examiner—Eric K. Nicholson
(74) Attorney, Agent, or Firm—Moser, Patterson & Sheridan, L.L.P.

(57) ABSTRACT

A tubing connector for joining the ends of two lengths of expandable tubing including two expandable tubular portions for mounting on the ends of the lengths of expandable tubing. Each portion includes a plurality of circumferentially spaced couplings for engaging corresponding couplings on the other portion. The engaging parts of the couplings are located on parts of the tubular portions which define an upset following expansion.

16 Claims, 5 Drawing Sheets

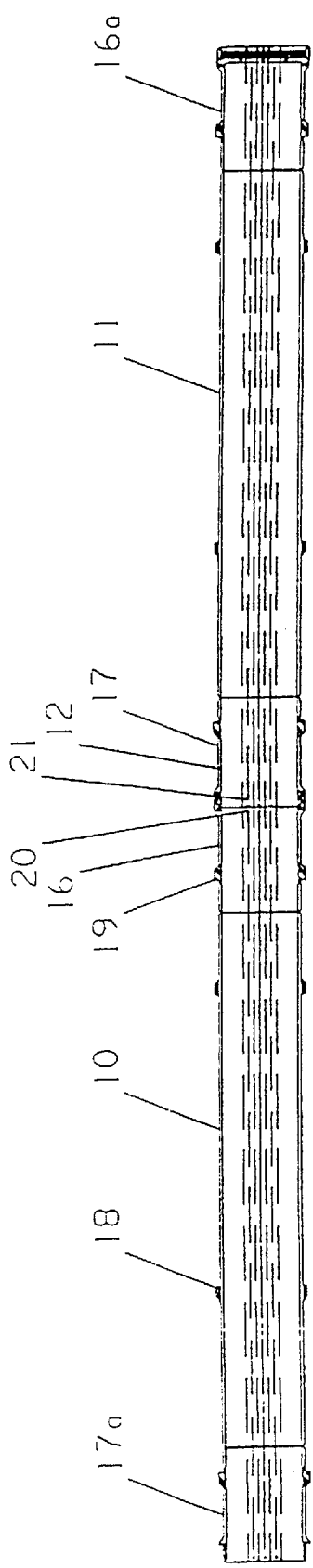
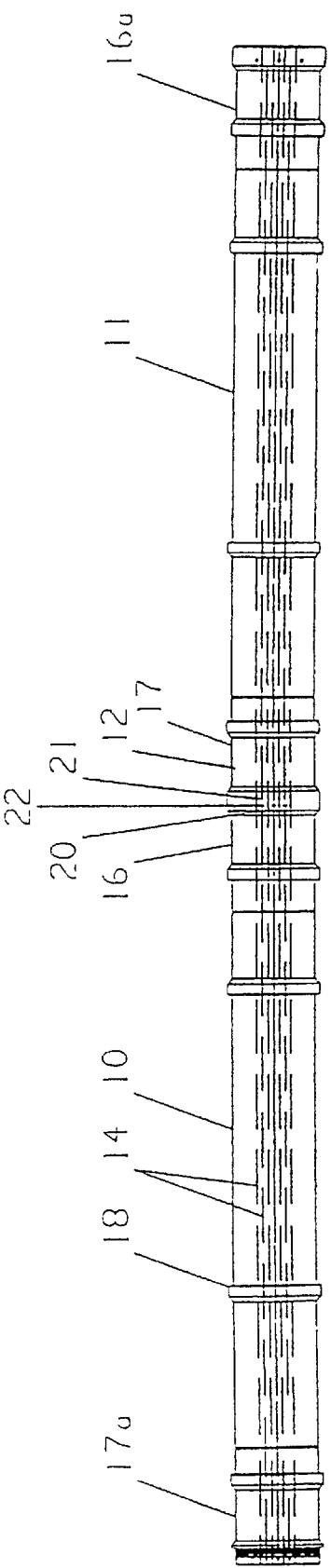

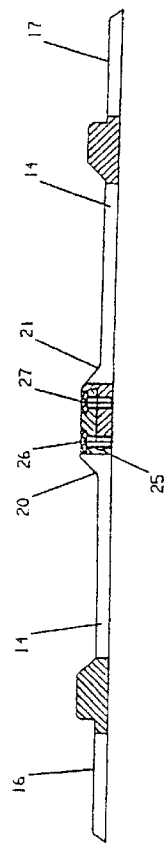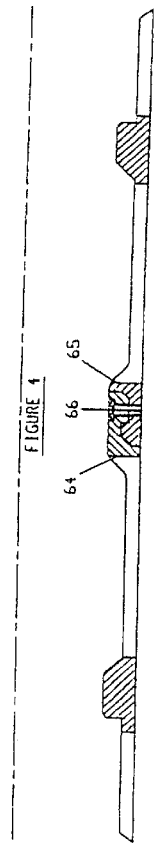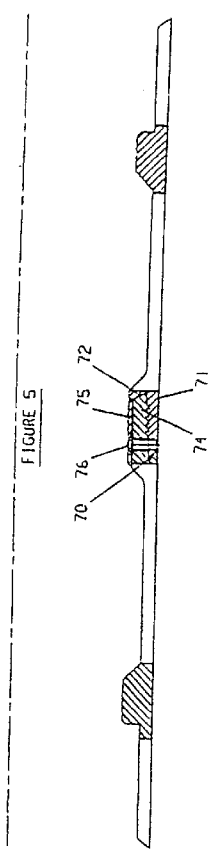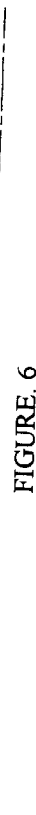
FIGURE 6

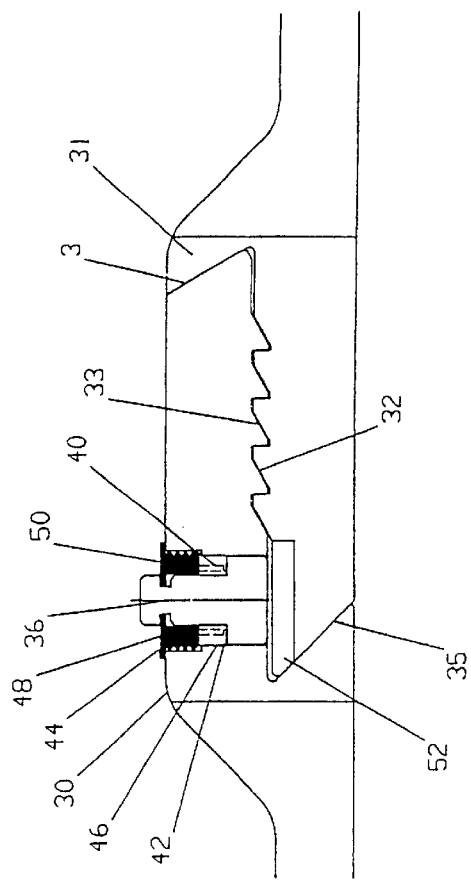
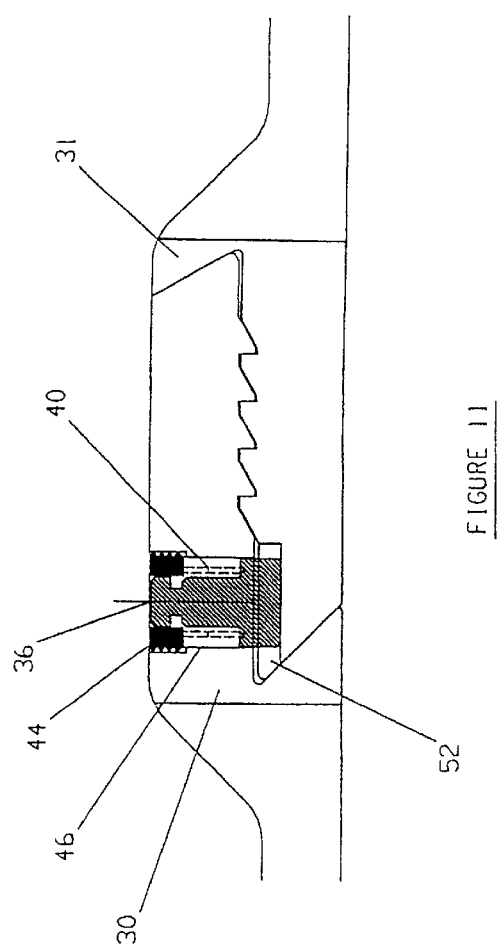

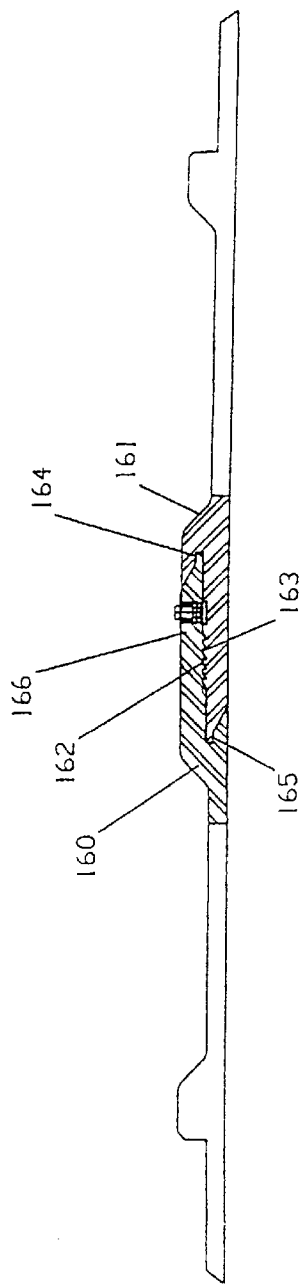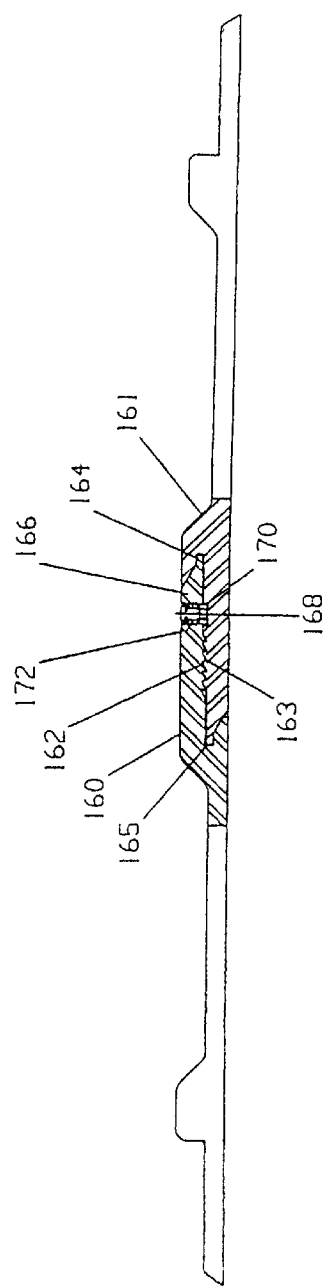

EXPANDABLE TUBING CONNECTOR FOR EXPANDABLE TUBING

This is a continuation of copending application Ser. No. 09/077,777 filed on Jun. 4, 1998, which is the National stage of International Application PCT/GB96/03026 filed on Dec. 9, 1996 and which designated the U.S.

This invention relates to a tubing connector, and in particular to a connector for use in joining lengths of expandable tubing.

WO-A-93/25800 (Shell Internationale Research), the disclosure of which is incorporated herein by reference, describes a method of completing an uncased section of a borehole in an underground oil-bearing formation. An expandable liner provided with overlapping longitudinal slots is fixed at a predetermined position in the borehole. A tapered expansion mandrel is then moved through the liner and expands the liner to a diameter larger than the mandrel maximum diameter. Ideally, the liner is expanded to such an extent that it contacts the bore wall.

In certain applications it is desirable to provide a relatively long section of borehole with slotted liner. This requires two or more lengths of slotted liner to be joined together at the surface, prior to running into the borehole. Conventionally, the lengths of liner are welded together, however this is a time-consuming and potentially dangerous operation, due to the elevated temperatures created by the welding process. The heat created by the welding operation may also affect the properties of the metal at the liner ends. Achieving consistent weld quality may also be difficult, particularly when the welding operation is to be carried out, for example, in exposed conditions on an offshore facility. Further, if any problems are encountered while running the liner into the borehole, and the liner string must be retrieved, it is not possible to disconnect the welded lengths of tubing and these must be cut apart, and the cut lengths may have to be scrapped.

It is among the objectives of the embodiments of the present invention to provide a tubing connector which will obviate or mitigate at least some of these disadvantages.

According to a first aspect of the present invention there is provided a tubing connector for joining the ends of two lengths of expandable tubing, the connector comprising two expandable tubular portions for mounting on the ends of the lengths of expandable tubing, each portion including a plurality of circumferentially spaced couplings for engaging corresponding couplings on the other portion, the engaging parts of the couplings being located on parts of the tubular portions which are substantially undeformed following expansion of the tubular portions.

For use with expandable tubing featuring overlapping longitudinal slots, the tubular portions may include corresponding overlapping longitudinal slots arranged such that the connected tubular portions exhibit a similar pattern of slots to the tubing, with the couplings located on the "nodes" between the ends of axially aligned slots.

To provide the connection with the necessary strength it will often be necessary for the thickness of material at the connected couplings, that is where the corresponding couplings overlap or meet, to be greater than that of the remainder of the tubular portions and the expandable tubing itself, such that the couplings may be upset from the inner or outer tubing surface.

Preferably, the couplings may be disconnected, to allow disconnection of the tubing lengths, if desired.

Preferably also, the cooperating or engaging parts of the coupling may define, for example, cooperating tongues and slots or pins and bores, the couplings may be threaded, and the couplings may define teeth or undercuts. The couplings will generally be provided in male and female form, that is one coupling is axially received within the other. The couplings may additionally be secured to one another by any suitable means or combination of means, including adhesive, radial screws or pins.

The couplings of one embodiment are in male and female form and define corresponding threads, the outer female coupling including a dog which is biassed towards a position engaging the corresponding male coupling. Preferably, the dog is initially held in a retracted position and may be released, once the couplings are in the desired relative positions, to engage the male coupling. Conveniently, the dog is in the form of a sprung pin.

Preferably also, the longitudinal extent of each coupling is restricted to parts of the tubular portions which are substantially undeformed following expansion of the tubular portions. In other embodiments the couplings may extend over parts of the tubular portions which are subject to deformation.

The connector may be provided in combination with lengths of expandable tubing.

The tubular members may include radially extending handling shoulders, to facilitate handling of the respective tubing lengths.

The tubular members may be integral with the respective tubing lengths, or may be formed separately and welded or otherwise connected to the tubing length. In the former arrangement the ends of the tubing lengths are machined or otherwise shaped to form the tubular members. In the latter arrangement the tubular members may be at least partially formed and then welded or otherwise fixed to the tubing lengths; in a preferred embodiment the longitudinal slots in the tubing lengths and the tubular portions are formed once the tubular portions have been welded to the respective tubing lengths.

According to a further aspect of the present invention there is provided a tubing connector for joining the ends of two lengths of expandable tubing, the connector including expandable tubular portions for mounting on the lengths of expandable tubing and each expandable tubular portion having a coupling part for joining with a coupling part of another tubular portion, a first coupling part being of larger diameter to receive a second coupling part, whereby the expanded connector defines an upset where said first and second coupling parts overlap.

The upset may be external or internal, though it is generally preferred that the upset is external. An external upset may assist in anchoring expanded tubing in a bore by engaging the bore wall or engaging cement into which the connector expands.

The thickness of material, typically metal, present at each upset will generally be equivalent to twice the thickness of the tubing or the expandable tubular portions.

According to a still further aspect of the present invention there is provided an expandable connector for joining the ends of two lengths of expandable tubing, the connector comprising first and second expandable tubular portions for mounting on the ends of the respective lengths of expandable tubing, the first portion including a plurality of circumferentially spaced dogs, each dog being biassed towards an extended position for engaging the second portion, the dogs initially being held in a retracted position and being releasable to move to the extended position to engage the second portion once the portions have been brought together.

According to another aspect of the present invention there is provided a connector comprising first and second threaded parts, the first part including a dog biassed towards the second part, wherein once the parts have been threaded together the dog engages the second part to restrict relative rotation of the parts.

Preferably, the dog is initially held in a retracted position, to permit relative rotation of the parts, and is releasable to engage the second part at an appropriate point. Conveniently, the dog is in the form of a sprung pin. The pin may be located in a bore in the first part and be released from the exterior of the part by, for example, withdrawing a clip engaging the pin and which rests on the outer surface of the first part.

These and other aspects of the present invention will now be described, by way of example, with reference to the accompanying drawings, in which:

FIG. 1 is a side view of two lengths of expandable tubing which have been joined using a tubing connector in accordance with a preferred embodiment of the present invention;

FIG. 2 is a sectional view of the tubing of FIG. 1;

FIGS. 3 through 9 are enlarged sectional views of parts of tubing connectors in accordance with various embodiments of the present invention;

FIGS. 10 and 11 are enlarged views of the connector of FIG. 9 of the drawings; and FIGS. 12 and 13 are sectional views of parts of a tubing connector in accordance with another aspect of the present invention.

Figure 7:
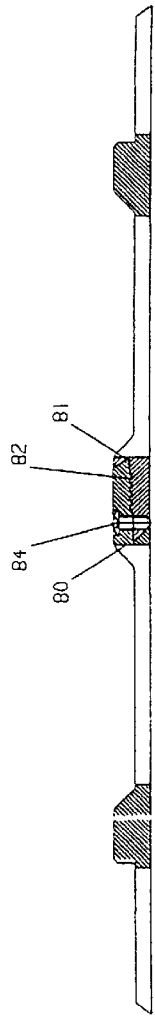

Reference is first made to FIGS. 1 and 2 of the drawings, which illustrate two lengths of expandable longitudinally slotted tubing 10, 11 which have been joined together using a connector 12 in accordance with a preferred embodiment of the present invention. The tubing lengths 10, 11 are provided with overlapping longitudinal slots 14 (only some of the slots have been shown for drawing clarity), to allow the tubing to be expanded as described in WO-A-93/25800 (Shell Internationale Research). The connector 12 comprises two expandable tubular portions 16, 17 which are slotted in a similar fashion to the lengths of tubing 10, 11. The tubular portions 16, 17 are welded to the ends of the respective tubing lengths 10, 11 and the slots then cut such that the tubular portions 16, 17 will expand in concert with the tubing lengths 10, 11.

Further tubular portions 16a, 17a are also shown mounted to the free ends of the tubing lengths 10, 11.

Each tubing length 10, 11 carries a number of handling shoulders 18, and corresponding shoulders 19 are provided on the tubular portions 16, 17. The shoulders 18, 19 are useful when handling and transporting the various parts, and may also be used when connecting the tubular portions 16, 17, as will be described.

Each tubular portion 16, 17 includes a plurality of circumferentially spaced couplings 20, 21 at the portion free end, for engaging a corresponding coupling on the other tubular portion 17, 16; the couplings 20, 21 are located at the "nodes" 22 between the ends of the slots 14 in the tubular portions 16, 17, the metal at the nodes 22 remaining substantially undeformed when the tubular portions 16, 17 are expanded.

Reference is now made to FIG. 3 of the drawings, which illustrates a pair of couplings 20, 21 in greater detail. It will noted that the coupling 20 defines a female portion 24 defining an internal screw thread and the coupling 21 defines a corresponding male portion 25 carrying an external thread and the ends of the portions 24, 25 are also undercut to minimise the possibility of radial separation. In addition, two screws 26, 27 fix the portions 24, 25 together.

It will be noted that the combined metal thickness of the joined couplings 20, 21 is greater than that of the adjacent tubular portions 16, 17, such that this form of connection would not be suitable where it was desired to provide expandable tubing with a smooth or flush outer surface.

Reference is now made to FIG. 4 of the drawings which illustrates threaded couplings 60, 61 which may be torqued up.

FIG. 5 of the drawings illustrates couplings 64, 65 which define a "stab in" connector, that is the coupling 64, 65 are simply pushed together, and a single screw 66 is also provided for securing each pair of couplings 64, 65 together.

FIG. 6 illustrates an arrangement in which one coupling 70 defines a threaded tongue 72 which is received by a slot 74 defined by a shroud 75 fixed on the other coupling 71. Further, a screw 76 is provided to secure the couplings 70, 71 together.

FIG. 7 illustrates couplings 80, 81 defining ratchet threads 82, 83 with a back angle, and including a securing screw 84.

Figure 8:
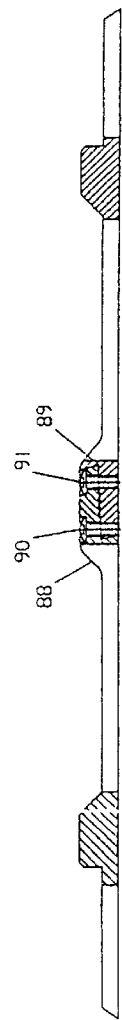

FIG. 8 illustrates couplings 88, 89 without threads and held together by two screws 90, 91.

Figure 9:
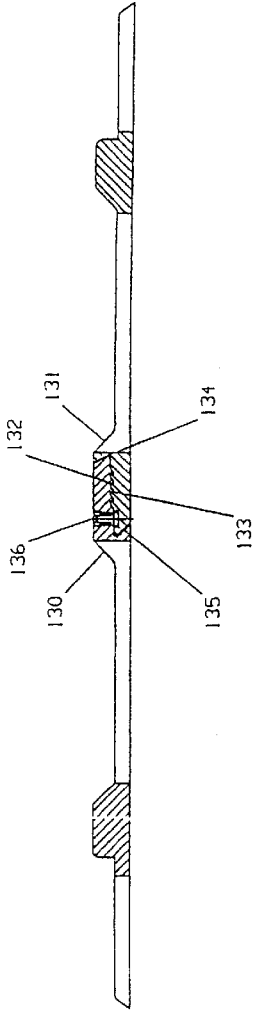

Reference is now made to FIG. 9 of the drawings, illustrating couplings 130, 131 in accordance with another embodiment of the invention. In this example the couplings 130, 131 define hook or ratchet threads 132, 133 and undercut end surfaces 134, 135. Additionally, the coupling 130 includes a sprung latch pin 136, further details of which may be seen in FIGS. 10 and 11 of the drawings. The pin 136 is biassed radially inwardly by a solid spring 140 acting between a ledge 142 defined on the pin 136 and a threaded retainer in the form of a grub screw 144 which is fixed in the outer end of the bore 146 which accommodates the pin 136. The pin 136 is thus biassed radially inwardly, but is initially retained in a retracted position (FIG. 10) by a spring clip 148 which engages an annular groove 150 in the outer end of the pin 136. The clip 148 is removed once the couplings 130, 131 have been made up, the head of the pin 136 then extending into a corresponding recess 152 in the end of the coupling 131, to prevent relative rotation of the couplings 130, 131.

FIGS. 12 and 13 illustrate couplings 160, 161 in which the couplings define threads 162, 163 and have tongued ends 164, 165 to engage corresponding grooves in the other coupling to prevent separation of the couplings 160, 161 on expansion of the connector. Like the embodiment illustrated in FIGS. 9, 10 and 11, the coupling 160 includes a spring latch pin or pin-lock 166, however, in this embodiment the pin 168 has a removable threaded head 170 and utilises a coil spring 172.

All of the embodiments described above are intended to be robust and to allow lengths of expandable tubing to be made up quickly and securely on site. The particular form of connection utilised will depend upon the particular application.

It will be clear to those of skill in the art that the above-described embodiments are merely exemplary of the present invention, and that various modifications and improvements may be made thereto without departing from the scope of the invention.

What is claimed is:

1. A tubing connector for joining the ends of two lengths of expandable tubing and permitting the joined lengths to be circumferentially expanded, the connector including circumferentially expandable tubular portions for mounting on the lengths of circumferentially expandable tubing and each circumferentially expandable tubular portion having a coupling part for joining with a coupling part of another tubular portion, a first coupling part of one tubular portion being of larger diameter to receive a second coupling part of another tubular portion, and the thickness of material at the connected coupling parts being greater than that of the remainder of the tubular portions, whereby following expansion of the connector and the tubing lengths the circumferentially expanded connector defines an upset from the tubing surface where said first and second coupling parts overlap.

2. The tubing connector of claim 1, wherein each expandable tubular portion includes a plurality of circumferentially spaced coupling parts for engaging co-operating coupling parts on another portion, the coupling parts being located on parts of the tubular portions which are not subject to deformation on expansion of the tubular portions.

3. The connector of claim 1, wherein the tubular portions include a plurality of longitudinal slots which are circumferentially staggered, every other slot having their ends in the same radial plane and the tubular portions further defining nodes between the ends of said slots which are axially aligned, the coupling parts being located on the nodes.

4. The connector of claim 1, wherein engaged coupling parts are disconnectable, to allow disconnection of joined tubing lengths.

5. The connector of any of claim 1, wherein the coupling parts define cooperating tongues and slots.

6. The connector of any of claim 1, wherein the coupling parts define cooperating pins and bores.

7. The connector of claim 1, wherein the coupling parts are threaded.

8. The connector of claim 1, wherein the coupling parts define teeth.

9. The connector of claim 1, wherein each coupling part defines an axially extending undercut female channel for co-operating with an axially extending male portion of the coupling part of the other tubular portion.

10. The connector of claim 1, wherein the coupling parts are securable to one another by adhesive.

11. The connector of claim 1, wherein the coupling parts are securable to one another by radially extending fasteners.

12. The connector of claim 1, wherein the coupling parts define co-operating threads, the outer female coupling part including a dog which is biassed towards a position engaging the corresponding male coupling part.

13. The connector of claim 12, wherein the dog is initially held in a retracted position and is releasable, once the coupling parts are in the desired relative positions, to engage the male coupling part.

14. The connector of claim 12, wherein the dog is in the form of a sprung pin.

15. The connector of claim 12, wherein the tubular portions include radially extending handling shoulders.

16. The connector of claim 12, in combination with lengths of expandable tubing.

* * * * *